Feb. 23, 1926.  1,574,124
C. F. SHERWOOD
PROCESS AND APPARATUS FOR MAKING GASKETS
Filed Oct. 25, 1922   2 Sheets-Sheet 1

WITNESS:
Rpf. P. Kitchel.

INVENTOR
Charles F. Sherwood
BY
Frank S. Busser,
ATTORNEY.

Feb. 23, 1926. 1,574,124
C. F. SHERWOOD
PROCESS AND APPARATUS FOR MAKING GASKETS
Filed Oct. 25, 1922    2 Sheets-Sheet 2

WITNESS:    INVENTOR
    Charles F. Sherwood
    BY
    ATTORNEY.

Patented Feb. 23, 1926.

1,574,124

UNITED STATES PATENT OFFICE.

CHARLES FREDERIC SHERWOOD, OF SAN FRANCISCO, CALIFORNIA, ASSIGNOR OF ONE-HALF TO LYNDON E. ADAMS, OF PHILADELPHIA, PENNSYLVANIA.

PROCESS AND APPARATUS FOR MAKING GASKETS.

Application filed October 25, 1922. Serial No. 596,733.

*To all whom it may concern:*

Be it known that I, CHARLES FREDERIC SHERWOOD, a citizen of the United States, residing at San Francisco, county of San Francisco, and State of California, have invented a new and useful Improvement in Processes and Apparatus for Making Gaskets, of which the following is a full, clear, and exact description, reference being had to the accompanying drawings, which form a part of this specification.

In the manufacture of gaskets, packing rings, etc., including such as are employed for sealing tube surfaces, as, for example, those interposed between a cap block and the removable head of an automobile engine, it is customary to stamp the gaskets from a sheet of asbestos, fibre or other suitable material. One type of these gaskets is of oblong form and contains a plurality of rectangular perforations. The specified method of manufacture is uneconomical, in that the amount of material removed to form the orifices or openings therein represent a considerable proportion of the entire amount in the original blank sheet, such stamped out pieces being only salable for scrap.

The object of my invention is to produce these gaskets without any waste of material whatever. My new process is not restricted in its application to gaskets of any particular contour, nor to gaskets of any particular material, nor to gaskets intended for any particular use, but is applicable to the production of any gasket, ring, or like article of sheet form intended for packing or sealing and which contains perforations or is of such contour that its production by the die stamping process involves inevitable waste.

My process involves the manufacture of gaskets direct from a mixture, sludge, paste or solution of suitable constituents, such, for example, as a sludge of asbestos fibre. This is preferably accomplished by causing the sludge to be sucked by a partial vacuum against a mold presenting a finely perforated area or screen corresponding to the solid parts of the gaskets and imperforate surfaces corresponding to the openings in the gaskets, so that liquid carrying the solid particles in suspension will be drawn through the screen while the solid particles in the sludge mixture will adhere to, and build upon, the air-permeable surfaces, and in subsequently, by means of air pressure, or by means of a mechanical scraper, or both, detaching the molded articles from the mold and finally drying. The mold should be a traveling mold, and the rate of travel should be timed in accordance with the thickness of the desired product and the rapidity of deposition.

This process lends itself to considerable modification. For example, the sludge mixture may be blown, be means of compressed air, against the face of the mold, thus positively forcing the liquid constituent of the sludge through the screen. The mold may be of cylindrical form and rotate on an axis, or the mold may comprise a series of units traveling in a straight line. The mold may rotate or travel continuously or intermittently. A thorough drying of the molded gaskets may be alone relied upon to detach them from the mold; or the vacuum may be maintained for a substantial length of time after the deposition of the fibrous or solid particles has been completed, thus reducing the moisture content as low as is possible with a commercially practicable degree of vacuum; or the vacuum may remain on the mold concurrently with the passage of the mold through an oven or other drying apparatus.

It is obvious, from the foregoing description, that the process is not dependent for its execution upon an apparatus of any particular construction; but certain features of my apparatus are novel, and my invention also comprises such novel structural features. In order to fully disclose such novel structural features as will enable those skilled in the art to practice the process without the necessity of designing a suitable apparatus, I have illustrated, in the accompanying drawings, two different machines, one of which is shown in some detail.

Figure 7:
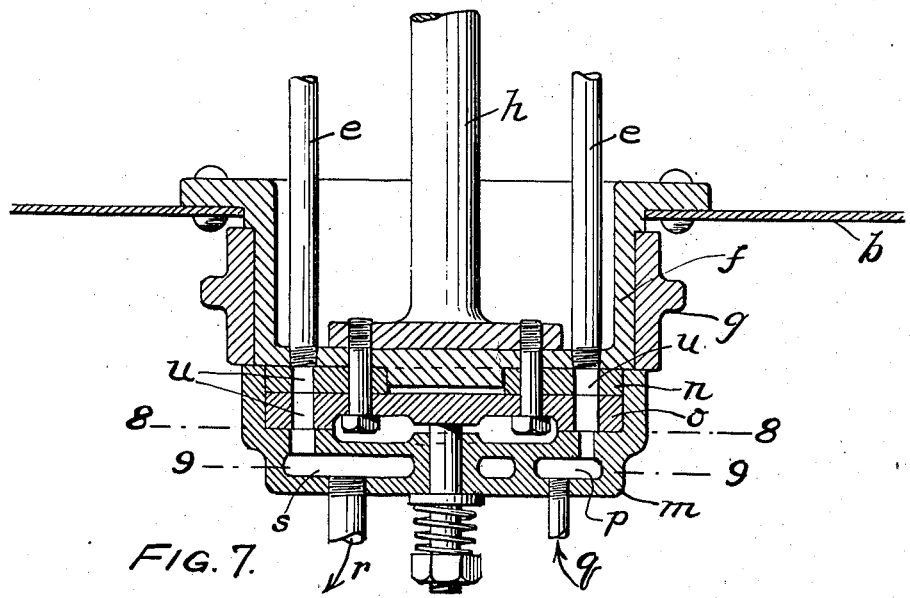
Fig. 7 is a longitudinal section, through the end head, of the drum of Figs. 2 and 3 and the valve applied thereto.
Figures 8, 9:
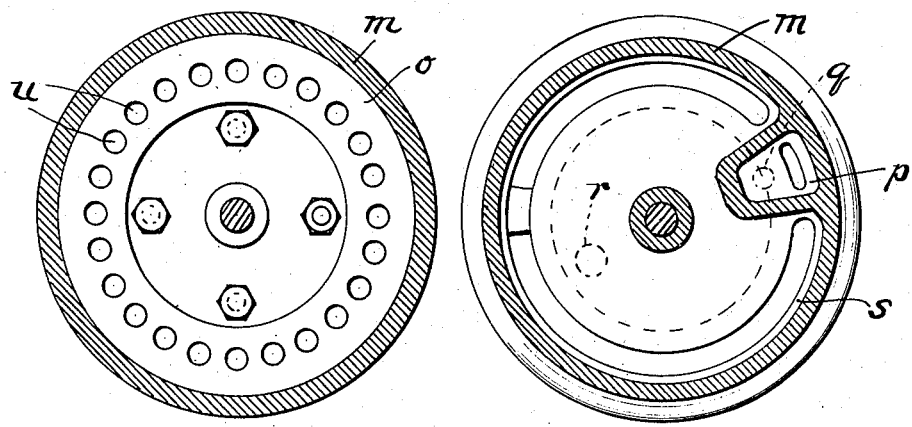

Figs. 8 and 9 are sections on the lines 8—8 and 9—9 of Fig. 7.

Figure 1:
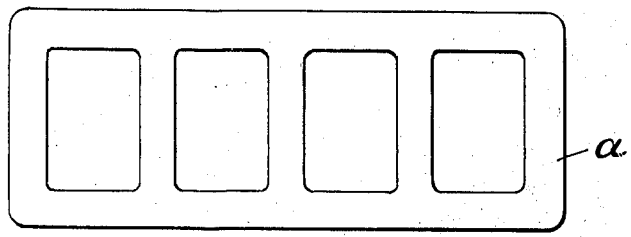
Fig. 1 is a plan view of a completed gasket of typical form.

The completed gasket of Fig. 1 has applied to it the reference letter $a$.

Figure 2:
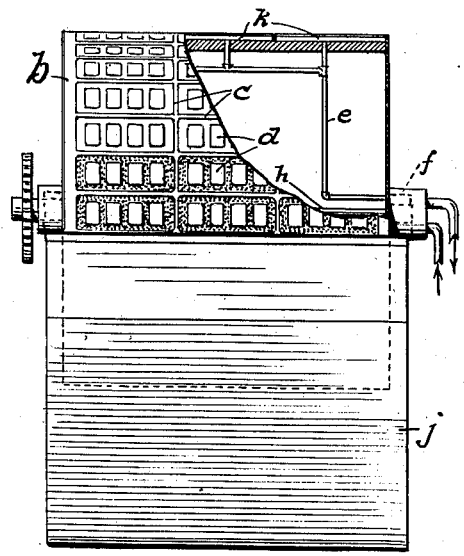
Fig. 2 is a side view, partly in section, of an apparatus embodying my invention and which is in part an adaptation of an Oliver filter and by means of which my new process may be carried out.
Figure 3:
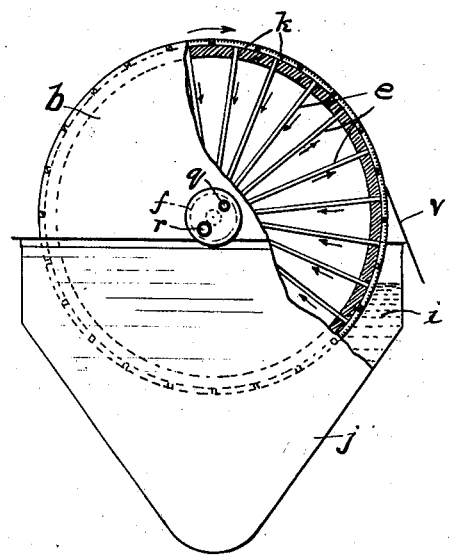
Fig. 3 is an end view, partly in section, of the same apparatus.

In Figs. 2 and 3: $b$ is a cylinder or drum having secured to its exterior cylindrical surface longitudinal and circumferential strips $c$ corresponding to the divisions between gasket units, and blocks $d$ corresponding to the orifices in said units. Supported on these strips and blocks is a fine mesh screen. Air pipes $e$ connect the spaces $k$ beneath the screen with one of the trunnions $f$ supporting the drum. The trunnions $f$ turn in bearings $g$ (see Fig. 7) and are secured to the drum shaft $h$, which is rotated from a suitable source of power. The drum is partly submerged in a bath of asbestos sludge $i$ contained in a vessel $j$.

A stationary valve $m$ (see Figs. 7, 8 and 9) is applied to the trunnion $f$ which connects with pipes $e$. A valve seat $n$ and a renewable plate $o$ is confined between the valve and the end head and is secured to the latter by bolts $q$. The valve contains a long arcuate chamber $s$ and a short chamber $p$. A suction pipe $r$ connects with chamber $s$ and a pressure pipe $q$ with chamber $p$. Holes $u$ in seat $n$ and plate $o$ align with the pipes $e$.

It will be readily understood that as the drum rotates, any given pipe $e$ is repeatedly connected with the suction chamber $s$ of the valve $m$ throughout the greater part of one complete rotation of the drum and is connected with the pressure chamber $p$ of the valve $n$ throughout the short remainder of a complete rotation.

Figure 4:
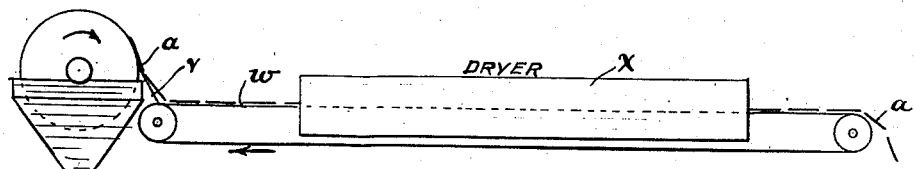
Fig. 4 is a diagram of the same apparatus associated with a drying oven.

Through the pipes $e$, therefore, suction is maintained in all the spaces $k$ that at any given time extend below the level of the sludge and preferably, also, in most of the spaces $k$ above the sludge level. In one or more of the spaces $k$ that at any given time are above the level of the sludge, and preferably when those spaces, in the drum's rotation, are approaching the level of the sludge, air pressure is admitted to blow the deposited layers of asbestos (forming the gaskets) free of the surface of the screen, a scraper $v$ (Figs. 3 and 4) effecting their complete detachment. The gaskets are deposited on a traveling conveyor $w$, which carries them through a drying chamber $x$. By reason of the maintenance of the vacuum on the spaces beneath the gasket after they emerge from the bath $i$ until they approach the scraper $v$, much moisture is extracted before the drying chamber is reached.

Figure 5:
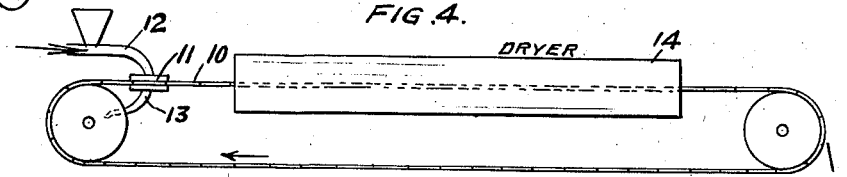
Fig. 5 is a diagram of a modified apparatus.
Figure 6:
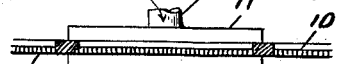
Fig. 6 is an enlarged view of a portion of the apparatus of Fig. 5.

In Figs. 5 and 6 I have diagrammed one of many possible modifications of apparatus. An endless chain of mold units 10 travels through a chamber 11 having an inlet pipe 12 and an exit pipe 13. The mold units are essentially the same in construction as those shown in Fig. 2 and hereinbefore described. The asbestos sludge is forced by pressure through pipe 12, the liquid flowing through the screen and the solid particles adhering thereto and building up thereon; the sludge continually flowing off the surface of the solid areas of the screen so as to form a gasket like that shown in Fig. 1. Preferably the chain of mold units is advanced step by step, the same remaining stationary for a sufficient length of time to build up a gasket to the desired thickness. The thus formed gaskets are carried through the drying chamber 14 and subsequently drop off the conveyor, as shown at the right hand end of Fig. 5.

Having now fully described my invention, what I claim and desire to protect by Letters Patent is:

1. The process of manufacturing gaskets of the type described which comprises flowing a sludge, containing a liquid constituent and a solid constituent, against a mold surface, in part wholly impermeable and in part permeable by only the liquid constituent, under the influence of vacuum, whereby the solid constituent builds up only on the permeable surface, thereby shaping the material into the form of a finished gasket, releasing the vacuum, and then forcibly passing air through the relatively moist gasket thus formed to drive off liquid from and consolidate the solid material.

2. The process of manufacturing gaskets of the type described which comprises forcibly flowing a sludge containing a liquid constituent and a solid constituent against a mold surface in part wholly impermeable and in part permeable by only the liquid constituent whereby the solid constituent builds up only on the permeable surface, thereby shaping the material into the form of a finished gasket, forcibly passing air through the relatively moist gasket in a direction tending to hold the material on the mold surface and then reversing the direction of the air flow to loosen the bond between the material and the mold surface to effect or facilitate its dislodgment.

3. The process of manufacturing gaskets of the type described which comprises causing a partial vacuum to act upon a sludge containing a liquid constituent and a solid constituent and draw the same against a mold surface in part wholly impermeable and in part permeable by only the liquid constituent whereby the solid contituent builds up only on the permeable surface, thereby shaping the material into the form of a finished gasket, withdrawing the mold from contact with the sludge while maintaining the vacuum and then loosening the bond between the gasket and the mold surface by air pressure.

4. An apparatus for manufacturing gaskets of the type described comprising a rotating drum, molds carried therein comprising sections impermeable by solids and liquids and sections permeable only by liquids, a container within which the drum revolves and which is adapted to contain a bath composed of a liquid constituent and the solid constituent of which the gasket is to be formed, and means to maintain suction on the inner face of those molds which at any given time are immersed in the bath and on some of the molds which have emerged from the bath and to at the same time apply air pressure to the inner face of other molds which previously have been subjected, in and out of the bath, to suction.

In testimony of which invention, I have hereunto set my hand, at New York, on this thirteenth day of October, 1922.

CHARLES FREDERIC SHERWOOD.